United States Patent [19]
Irie

[11] Patent Number: 5,303,019
[45] Date of Patent: Apr. 12, 1994

[54] INTER-VEHICLE DISTANCE MEASURING DEVICE

[75] Inventor: Tatsuji Irie, Hyogo, Japan

[73] Assignee: Mitsubishi Denki Kabushiki Kaisha, Tokyo, Japan

[21] Appl. No.: 987,780

[22] Filed: Dec. 9, 1992

[30] Foreign Application Priority Data

Dec. 9, 1991 [JP] Japan ............................ 3-324536

[51] Int. Cl.⁵ .................. G01C 3/00; G01C 5/00; B60T 7/16
[52] U.S. Cl. ................................... 356/1; 180/167; 250/201.6; 250/201.8; 354/402; 348/142
[58] Field of Search .................. 356/1; 358/107; 354/402; 250/201.6, 201.8; 180/167

[56] References Cited

U.S. PATENT DOCUMENTS

| | | |
|---|---|---|
| 4,749,848 | 6/1988 | Sorimachi . |
| 5,023,712 | 6/1991 | Kajiwara . |
| 5,131,740 | 7/1992 | Maekawa ................. 356/1 |

FOREIGN PATENT DOCUMENTS

| | | |
|---|---|---|
| 0474067 | 3/1992 | European Pat. Off. . |
| 0488392 | 6/1992 | European Pat. Off. . |
| 4109159 | 9/1991 | Fed. Rep. of Germany . |
| 60-33352 | 8/1985 | Japan . |
| 63-38085 | 7/1988 | Japan . |
| 63-46363 | 9/1988 | Japan . |
| 1-35305 | 7/1989 | Japan . |
| 3-269314 | 11/1991 | Japan . |

Primary Examiner—Stephen C. Buczinski
Attorney, Agent, or Firm—Sughrue, Mion, Zinn, Macpeak & Seas

[57] ABSTRACT

An inter-vehicle distance measuring device which can automatically set a tracing window for tracing an image of a fore-running vehicle to be measured for distance. A window setting unit sets plural numbers of windows at given locations on one of the images. An estimate member calculates a distance up to objects caught by those windows, detects the symmetry of the image, and estimates presence of a fore-running vehicle and its position on one of images, and the detected distance data as well. A tracing window is automatically set at the position.

5 Claims, 7 Drawing Sheets

INTER-VEHICLE DISTANCE MEASURING DEVICE

BACKGROUND OF THE INVENTION

The present invention relates to an optical type distance measuring device using image sensors, and more particularly to a device which continuously measures a distance from a first vehicle to another vehicle running ahead of the first vehicle (hereinafter referred to as "an inter-vehicle distance measuring device").

Conventional optical type distance measuring devices using image sensors are disclosed in Japanese Patent Publication Nos. Sho. 63-38085, 63-46363. Any of those devices, as shown in FIG. 10, contain right and left optical systems including lenses 1' and 2', respectively, which are spaced from each other by a base width L. Image sensors 3' and 4' are positioned at the focal distance f from the lenses 1' and 2', respectively. A signal processor 51 calculates a distance to an object 52 from the vehicle carrying the distance measuring device (referred to as the measuring-device carrying vehicle) by processing image signals received from the image sensors 3' and 4'.

Next, the method of measuring the distance up to the object 52 will be described. The signal processor 51 receives the image signals from the image sensors 3' and 4', which represent images of the object 52 formed on the image sensors 3' and 4' through the lenses 1' and 2', respectively. The processor then electrically superposes those image signals from the image sensors 3' and 4' by shifting them, and calculates, by the following equation, a distance R from the measuring-device carrying vehicle to the object 52 by the principle of the trigonometric measurement on the basis of an amount (d) of shifting when the image signals are most coincident with each other.

[Formula 1]
$$R = (f \times L)/d$$

On the other hand, a method for tracing the vehicle running ahead picked up by the image sensors, for example, is disclosed in Japanese Patent Publication No. Sho. 60-33352. A feature of the apparatus thereof is recited to trace an image of a target on the screen of a display unit, in which an operator manually sets a tracing gate (window) enclosing the target on the screen, while watching the screen.

The conventional distance measuring device is constructed such that the distance from the first vehicle to the object is obtained by comparing the images picked up by the right and left optical systems. Therefore, when measuring the inter-vehicle distance to the vehicle running ahead while the first vehicle carries the distance measuring device and where other vehicles are operating on the right or left side of the vehicle running ahead in the same direction, there is a problem that the operator of the first vehicle cannot detect which of the vehicles is under measurement.

Further when starting to trace the image of the vehicle running ahead, the operator manually sets a window for tracing an image on the display screen by means of a joystick or a trace pole while watching the screen. At this time, the operator's attention tends to be distracted from the forward direction, which may result in the occurrence of a traffic accident.

SUMMARY OF THE INVENTION

The present invention has been made to eliminate the problems as described above. More specifically, an object of the invention is to provide an inter-vehicle distance measuring device which is provided with the functions of both the conventional optical type device for measuring inter-vehicle distance and the conventional device for tracing a vehicle running ahead, such that, after setting the image of a target, a distance to the target from the measuring device can be measured continuously so long as it is within a range of an image sensor, and a target vehicle can be detected among a plurality of vehicles running ahead of the measuring-device carrying vehicle.

Furthermore, another object of the present invention is to provide an inter-vehicle distance measuring device which can automatically set a window for tracing an image of a target vehicle running ahead, without an operator having to watch the display.

An inter-vehicle distance measuring device according to the present invention comprises a pair of image sensors substantially vertically arranged for picking up an image of a fore-running (second) vehicle, window setting means for setting a plurality of windows on the image, distance detecting means for calculating distances from the measuring-device carrying (first) vehicle to objects caught by the windows, symmetry detecting means for detecting the symmetry of an image signal in a region within an image, and estimating means for estimating the presence of a fore-running vehicle and the location of the fore-running vehicle by using the result of the symmetry judgement and distance data.

The inter-vehicle distance measuring device comprises a tracing window setting means for automatically setting a tracing window of a size dependent on the distance to the estimated position of the fore-running vehicle, image tracing means for tracing a fore-running vehicle image with the tracing window, and tracing distance detecting means for detecting a distance up to the fore-running vehicle caught by the tracing window.

Namely, the inter-vehicle distance measuring device of the invention measures distances up to targets caught by the windows such that the vertically adjacent image signals which are picked up by the image sensors, are compared with each other so as to electrically detect displacements of the images, and the result is subjected to the previously-mentioned trigonometric measuring method. On the basis of a result of the measurement, presence or absence of a vehicle running ahead or other obstacles and a rough position of the fore-running vehicle are monitored. The symmetry detecting means detects an area having a good right and left symmetry in the image area, and determines the position of the detected area as the position of the fore-running vehicle. Then, the estimating means estimates the presence and position of the vehicle running ahead in the sensor image on the basis of the data thus obtained.

After the position of the vehicle running ahead on the image sensor is estimated, a tracing window of the size dependent on the distance up to the fore-running vehicle is determined based on the estimated position, and by virtue of the determined tracing window, a distance up to the fore-running vehicle is detected while tracing the fore-running vehicle image.

DETAILED DESCRIPTION OF THE PREFERRED EMBODIMENT

Embodiment 1

Figure 1:
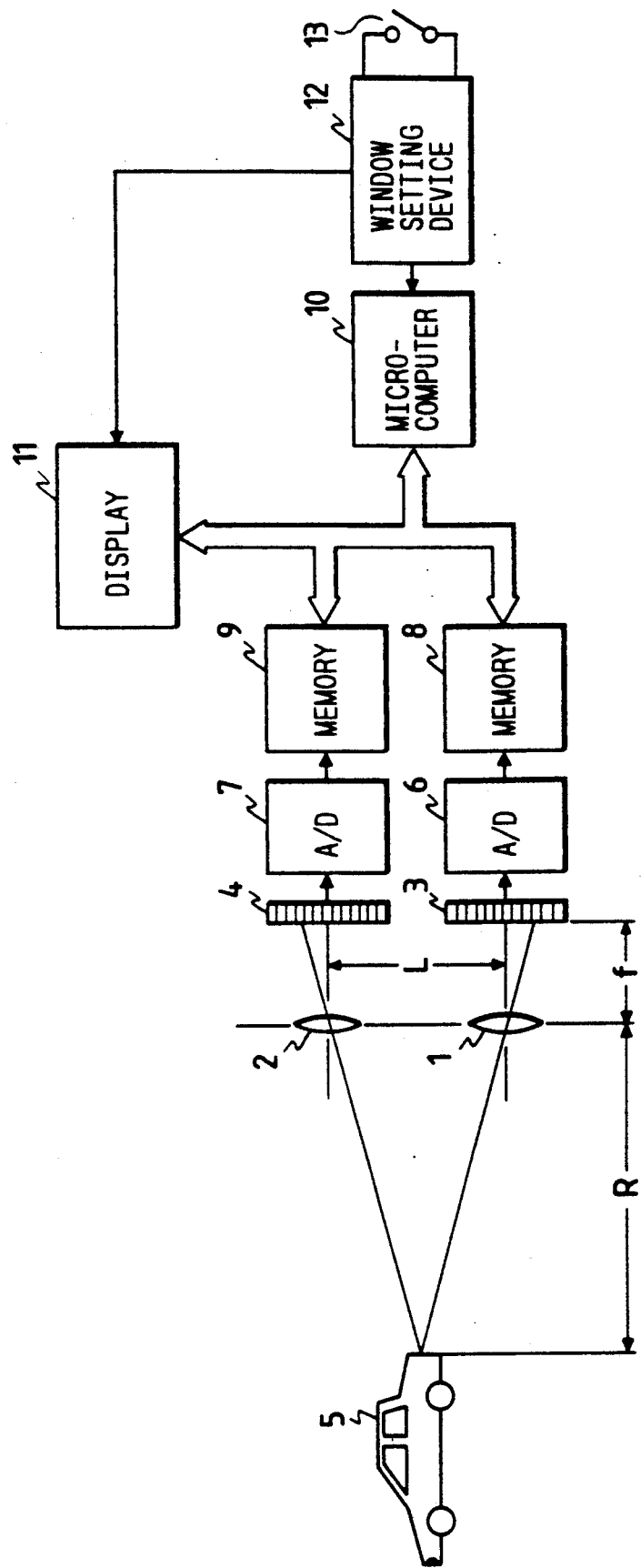
FIG. 1 is a diagram showing the construction of a inter-vehicle distance measuring device according to an embodiment of the present invention.

In FIG. 1, lenses 1 and 2 which are separated by a base line distance L constitute upper and lower optical systems, respectively. Two-dimensional image sensors 3 and 4 are disposed in association with the lenses 1 and 2, respectively. A fore-running motor vehicle 5 is traced. Analog-to-digital (A/D) converters 6 and 7 convert the analog signals output from the image sensors 3 and 4, respectively, into digital signals. Memories 8 and 9 store the signals from the A/D converters 6 and 7, respectively. A microcomputer 10 is connected to memories 8 and 9. A display screen 11 and a window setting unit 12 are described below. The display 11 is provided to display an image picked up by the upper image sensor 4 under control of the microcomputer 10. The window-setting unit 12 which is connected to the display 11 sets a window to specify an object under distance measurement on the display. The window setting unit 12 is connected to an image-trace instruction switch 13 operated by a driver.

Figure 2:
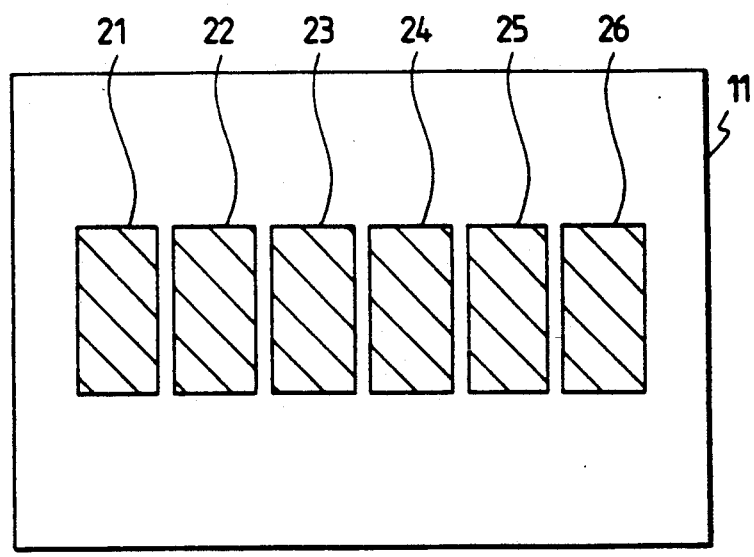
FIG. 2 is a diagram showing a plurality of distance measuring windows displayed on the screen of a display unit.
Figure 3:
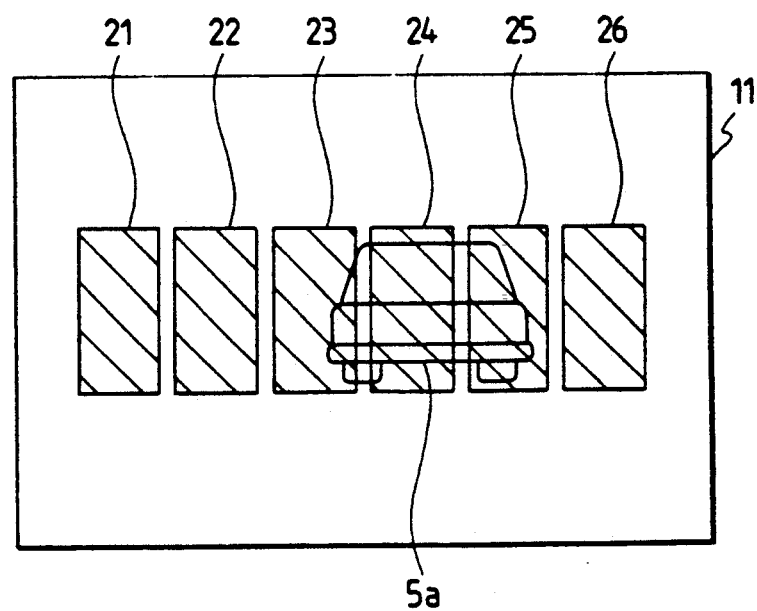
FIG. 3 is a diagram showing the window-contained display on the screen in which a fore-running vehicle image is displayed.

In the inter-vehicle distance measuring device thus arranged, when a driver operates the image-trace instruction switch 13, the window setting unit 12, as shown in FIG. 2, sets a plurality of distance measuring windows 21, 22, 23, 24, 25, and 26 on the display 11 visually presenting an image of a view lying ahead of the device-carrying vehicle, which is picked up by the upper image sensor 4. As shown in FIG. 2, those windows which are located at predetermined positions on the screen are horizontally and equidistantly arrayed in a line. As shown in FIG. 3, when a fore-running vehicle image 5a is displayed on the screen, the vehicle image is caught by the windows 21 to 26.

The windows are provided to facilitate measuring the distances up to the object caught by the windows. The distance measuring method will be described by using the window 24 as catching the fore-running vehicle image 5a. To start with, the microcomputer 10 reads an image signal within the window 24 from the memory 9, and uses the image signal as a reference image signal for a distance calculation.

Figure 4:
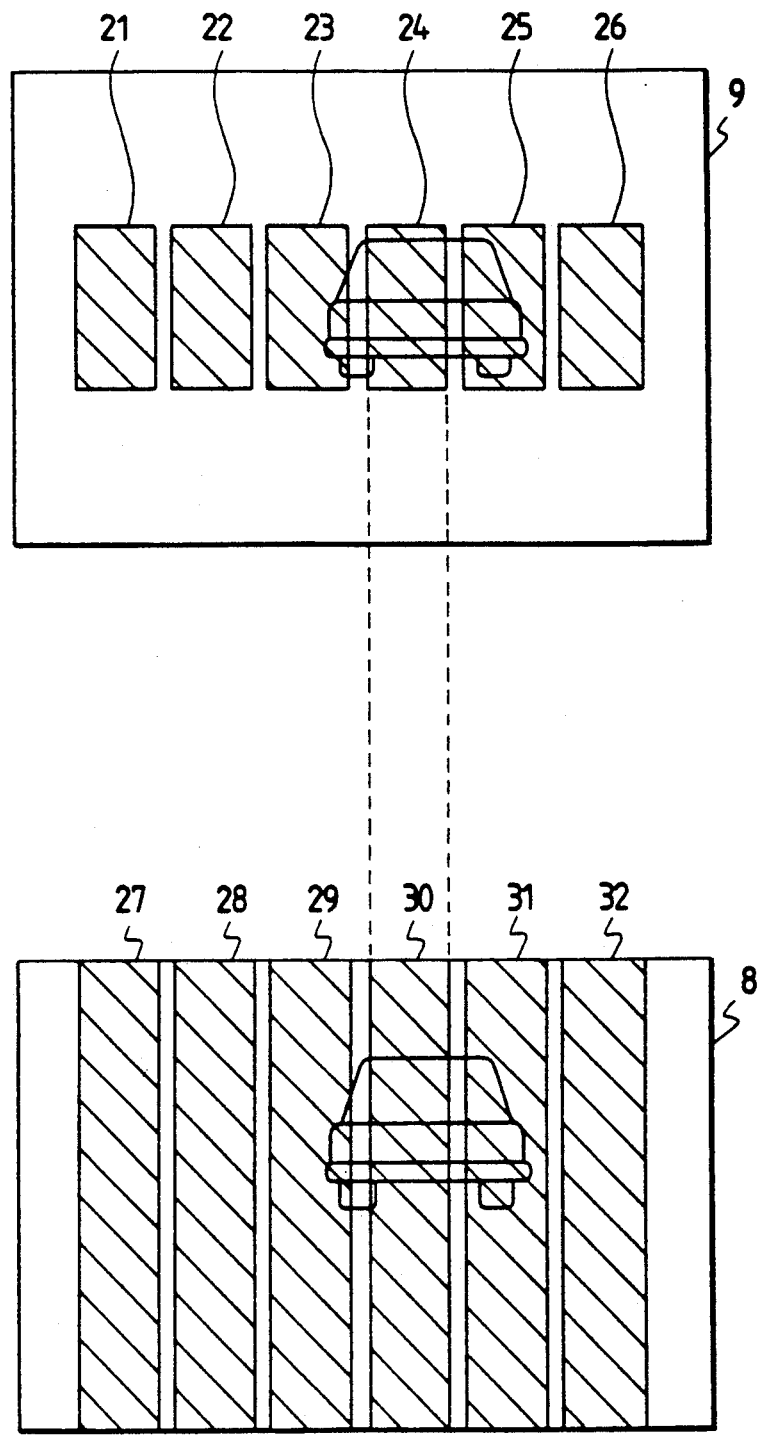
FIG. 4 is a diagram showing the comparison of the image signals to be compared with the reference image signals within the distance measuring windows.

As seen from the illustration of FIG. 4, the area in the memory 8 relative to the distance calculation is a comparison area 30 corresponding to the location of the distance measuring window 24. The area 30 is an area resulting from vertical expansion of the area corresponding to the window 24.

Namely, the microcomputer 10 selects the memory area 30 in the memory 8 storing the image signal of the lower image sensor 3 corresponding to the window 24, to shift the image signal of the memory area 30 with respect to the reference image signal 24, pixel by pixel, to accumulate the differences between the corresponding pixels in the images in one shift, thereby obtaining a total sum of the absolute values of the differences. That is, a position of the image in the memory area 30 most resembling the image in the window 24 is obtained by shifting the image signals pixel by pixel.

Assuming that the number X represents the amount of shifting required when the corresponding pixels are successively compared and the total sum of the absolute values of the difference signals takes a minimum value, further assuming the pixel pitch P, the base length L of the optical systems and the focal distances f of the lenses 1 and 2, a distance R from the measuring-device carrying vehicle to the fore-running vehicle 5 is expressed by the following equation. In this way, the distance R from the device-carrying vehicle to the fore-running vehicle 5 can be measured.

[Formula 2]

$$R = (f \times L)/(X \times P)$$

With respect to the distance measuring windows 23 and 25 catching the fore-running vehicle image 5a, the distance R is measured by the similar system. And with respect to the distance measuring windows 21, 22 and 26 catching an object without the fore-running vehicle 5, each distance to the object caught by the windows is measured.

Thus, the objects caught by the distance measuring windows 21 to 26 on the display 11 as shown in FIG. 4 are compared with the image within the comparison regions 27 to 32 of the corresponding memory 8 corresponding to the respective windows, thereby measuring the distances to the objects caught by the windows 21 to 26.

The microcomputer 10 compares the measuring values of the windows 21 to 26 with each other, and selects the adjoining windows containing the same measuring distance which is relatively short. In other words, the distance measuring windows 23, 24 and 25 which catch the objects located at a shorter distance than that of the background are selected. It is estimated that the fore-running vehicle 5 would be present at the locations of the windows 23, 24 and 25 unless measuring values of those windows abruptly change with time. In a case where an object to be measured for distance is a motor vehicle, the silhouette of the vehicle is generally symmetrical. By utilizing such feature, the system detects the symmetry within the area in which the distance measuring windows 21 to 26 are set, and determines the presence and position of the fore-running vehicle image 5 on the display 11, in addition to the distance information.

Figure 5:
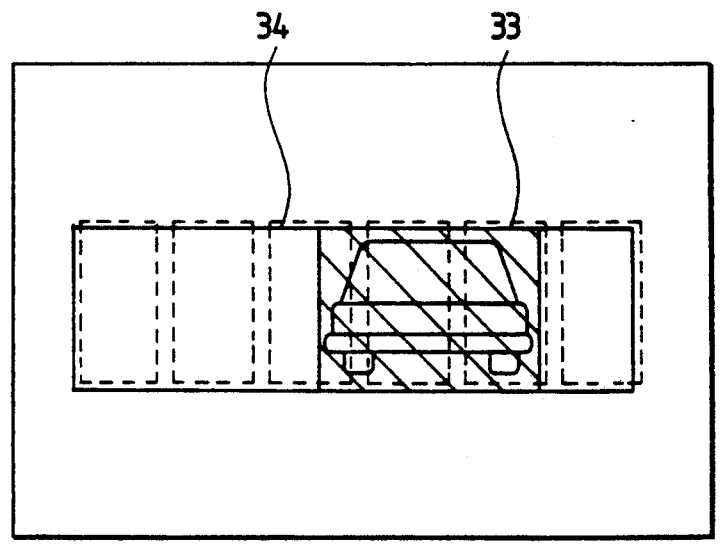
FIG. 5 is a diagram showing the symmetry detecting gate and the symmetry detecting region within which the symmetry detecting gate is shifted.

As shown in FIG. 5, a symmetry detecting gate 33 having the size dependent on the distance R is formed on the basis of the distance data obtained by the windows 23, 24 and 25 catching the image of the fore-running vehicle 5 as shown in FIG. 5. In the memory 9, the symmetry detecting gate 33 is shifted within a symmetry detecting region 34 containing the distance measuring windows 21 to 26. Through the shifting motion of the symmetry detecting gate 33, equation (3) is used for the image signal within the symmetry detecting gate 33 in order to evaluate the symmetry of the silhouette of the vehicle.

In equation (3), S(i, j) represents an image signal within the symmetry detecting region 34, and expresses an optical density in 256 gray levels. Pixel numbers m and n represent the width and height of the symmetry detecting gate 33. Pixel number w indicates the width of the symmetry detecting region 34. k=1, 2, ..., w-m.

$$A_K = \sum_{j=0}^{n-1} \sum_{j=0}^{\frac{m}{2}-1} \{|S(k+i,j) - S(k+m-1-i,j)|\} \quad \text{[Equation 3]}$$

The best symmetry is obtained at the position where the value of $A_k$ is the smallest. Actually, some silhouettes having symmetry are present except the fore-running vehicle 5. Accordingly, the results from the calculation of the equation (3) have some minimum values. The positions of the minimum values are candidates for the position of the fore-running vehicle 5.

As described above the fore-running vehicle 5, or the position of it, can be selected from those candidate points on the basis of the stability data with respect to time and the distance data by the windows 21 to 26. In this way, the position of the fore-running vehicle image 5a is determined on the display 11.

Figure 7:
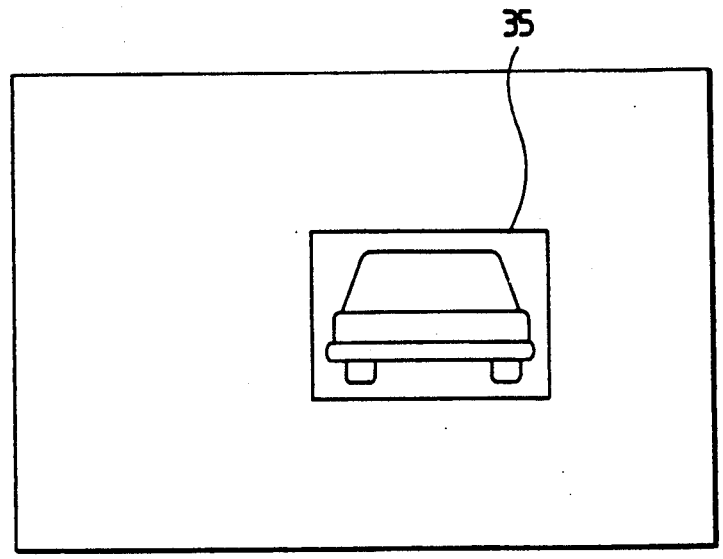
FIG. 7 is a diagram showing a state that a tracing window is set on a fore-running vehicle image.

A tracing window 35, as shown in FIG. 7, is set at the determined position on the display 11 by the window setting unit 12. The tracing window 35 has the same size as that of the symmetry detecting gate 33 that is set according to the measuring values of the distance measuring windows 23, 24, and 25.

Figure 6:
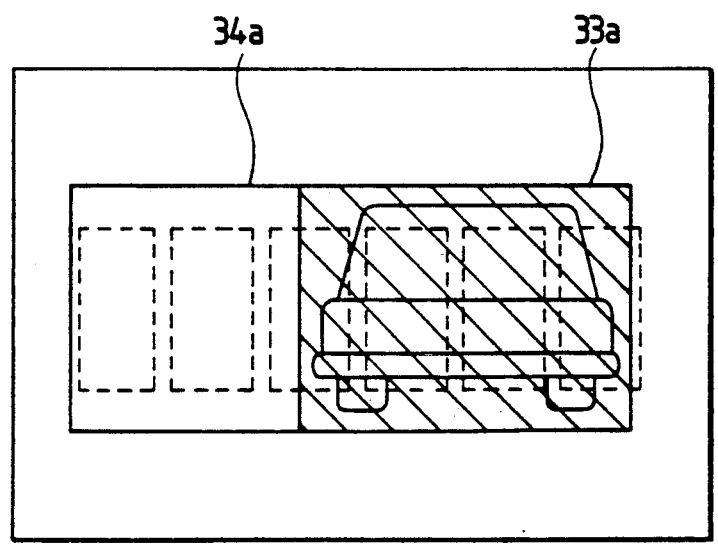
FIG. 6 is a diagram showing the symmetry detecting gate of large size and the symmetry detecting region.
Figure 8:
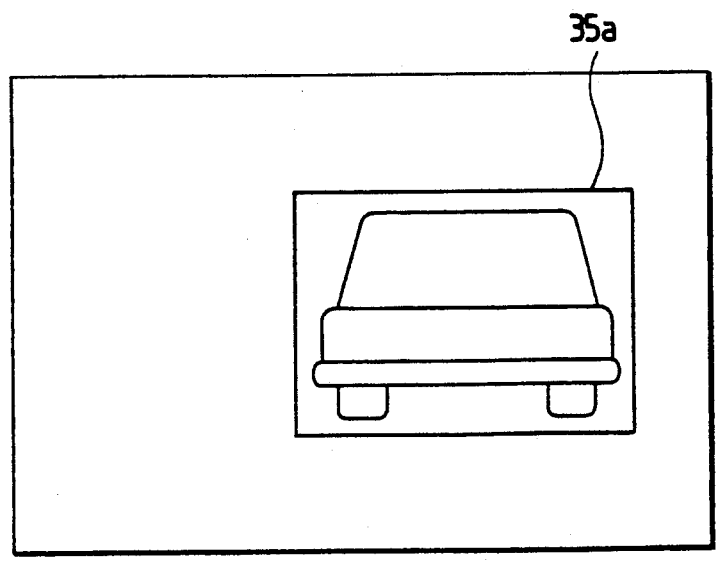
FIG. 8 is a diagram showing a state that a large tracing window is set on a fore-running vehicle image.

The size of the fore-running vehicle image 5a varies according to the distance R up to the fore-running vehicle 5. When the distance measuring value is large, the tracing window 35 of small size is set. When the measuring value is small, a symmetry detecting gate 33a is set to a large size as shown in FIG. 6. In this case, the symmetry detecting region 34a is as shown in FIG. 6, so that a large tracing window 35a is set as shown in FIG. 8.

After the tracing window 35 enclosing the fore-running vehicle image 5a is set as described above, the tracing window 35 starts to trace the fore-running vehicle image 5a. The image tracing operation is similar to that of the conventional device disclosed in Japanese Patent Laid-Open Publication No. Sho. 60-33352 and Japanese Patent Laid-Open Publication No. Hei. 1-35305. No further explanation of it will be given.

Furthermore, a distance between the fore-running vehicle 5 caught by the tracing window 35 and the measuring-device carrying vehicle is detected. In determining the distance between the fore-running vehicle and the measuring-device carrying vehicle, an image signal within the tracing window 35 tracing the fore-running vehicle image 5a is used as a reference image signal for the calculation of inter-vehicle distance. Further, the corresponding pixels of the vertical image signals are compared successively and the principle of the trigonometric measurement is used as in the manner described in connection with the equation (2). The tracing window 35 traces the fore-running vehicle image 5a, even if the vehicle image 5a moves to depict the trace on the display 11, and continuously detects the inter-vehicle distance between the fore-running vehicle 5 and the measuring-device carrying vehicle.

Figure 9:
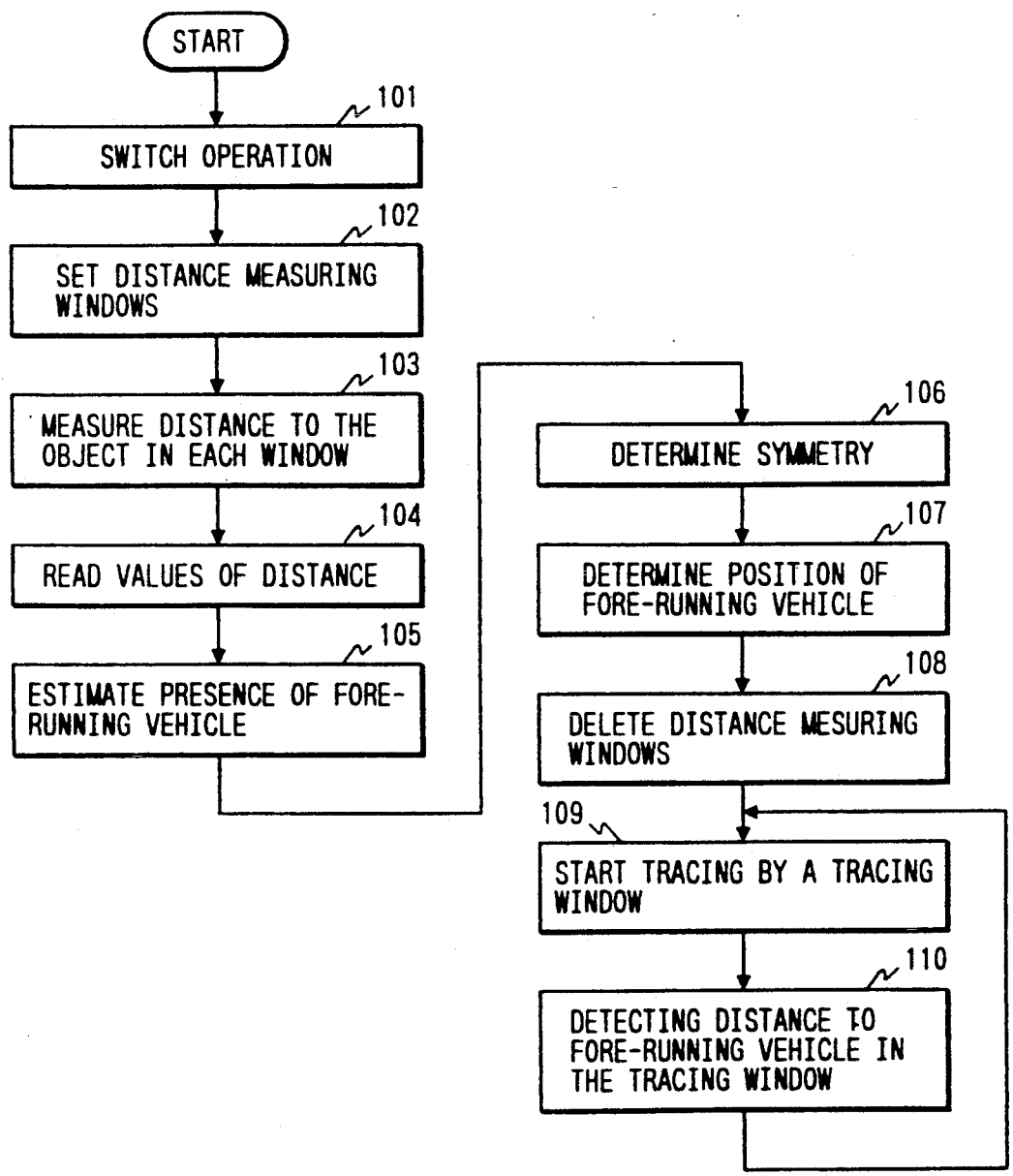
FIG. 9 is a flow chart showing the operation of the inter-vehicle distance measuring device.
Figure 10:
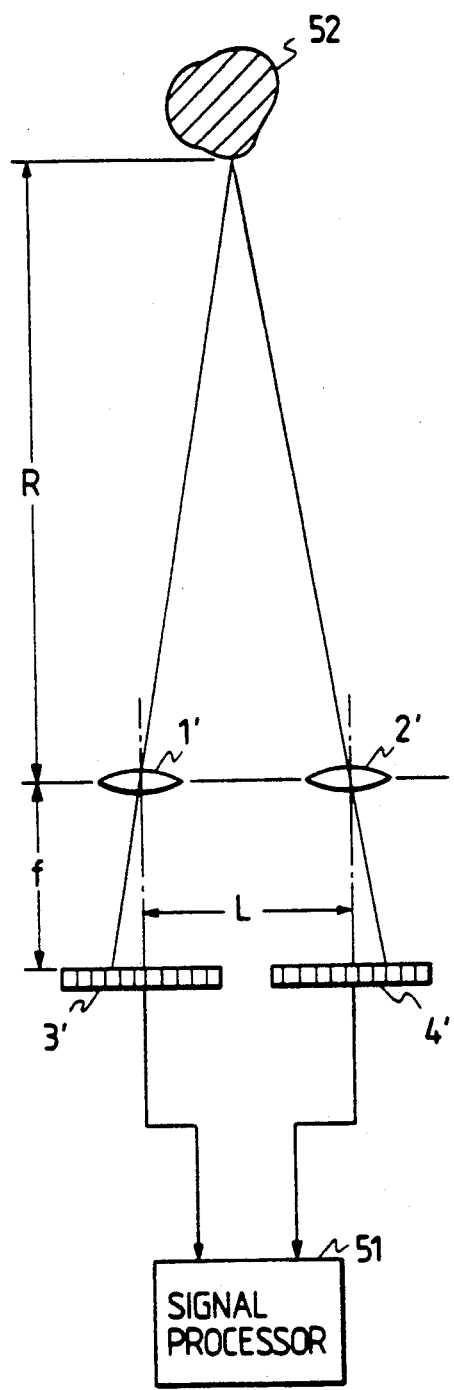
FIG. 10 is a diagram showing the construction of a conventional inter-vehicle distance measuring device.

The above operation can be explained by a flow chart as shown in FIG. 9. When a fore-running vehicle 5 appears in a front of the measuring-device carrying vehicle, a driver operates the image-trace instruction switch 13 (step 101). The microcomputer 10, upon receipt of an image-trace instruction signal from the switch, controls the window setting unit 12, causing it to set the plurality of distance measuring windows 21 to 26 at given positions on the display 11 (step 102). Then, the microcomputer 10 measures the distances from the measuring-device carrying vehicle to the objects caught by the windows 21 to 26 (step 103).

The measured distance data and the window positions are stored into the memory (step 104). The adjacent windows corresponding to the relatively short distance and provide substantially the same measuring values are selected from those windows 21 to 26. Presence of the fore-running vehicle 5 is estimated on the basis of the selected windows (step 105). Then, the symmetry detecting gate 33 having the size dependent on the measuring distance is provided, and detects the symmetry of the silhouette of the fore-running vehicle within the symmetry detecting region 34. The candidate regions of the fore-running vehicle 5 are picked up (step 106). The system determines the fore-running vehicle image 5a by using the symmetry data and distance data (step 107). The distance measuring windows 21 to 26 are erased on the display 11 (step 108). The tracing window 35 having the size dependent on the inter-vehicle distance is set at the selected position (step 109). Thereafter, the distance between the fore-running vehicle 5 caught by the tracing window 35 and the measuring-device carrying vehicle is continuously detected (step 110: the system returns to the step 109 after executing the step 110).

As described above, a fore-running vehicle running ahead of the measuring-device carrying vehicle is picked up through a pair of upper and lower optical systems. One of the images picked up by the image sensor is displayed, while a plurality of distance measuring windows are set at given positions on the screen. Distances from the measuring-device carrying vehicle to the objects caught by the distance measuring windows are measured. The symmetry of the image is detected. In this way, the presence and position of the fore-running vehicle are estimated. Accordingly, where a plurality of fore-running vehicles are present, the system can determine the fore-running vehicle to be measured for distance. Further, an image is traced in a manner that a tracing window enclosing the specified fore-running vehicle at the position where the fore-running vehicle is present anew, is set and the distance from the measuring-device carrying vehicle to the fore-running vehicle caught by the tracing window is detected. Therefore, the tracing window for tracing the fore-running vehicle image can be automatically set without interfering with the driving operation.

What is claimed is:

1. A device installed on a first vehicle for measuring a distance to a second vehicle running ahead of said first vehicle, said device comprising:

first and second image sensors arranged vertically, each for picking up an image, including said second vehicle and background images;

window setting means, coupled to said first and second image sensors, for setting a plurality of distance measuring windows arranged perpendicularly with said arrangement of said first and second image sensors, respectively, on the image picked up by said first image sensor;

corresponding area setting means, coupled to said second image sensor, for setting a plurality of window areas corresponding to said distance measuring windows, respectively, on an image picked up by said second image sensor;

first distance determining means for comparing the image signals contained within said distance measuring windows with the image signals contained within said window areas corresponding to said distance measuring windows, respectively, to determine distances to objects contained within each of said distance measuring windows from said first vehicle, and for selecting adjoining windows from said distance measuring windows which include a portion of said image that is a substantially equal distance away from said first vehicle, indicating the presence of image data corresponding to said second vehicle;

comparison window setting means for setting a comparison window corresponding to said selected adjoining windows in said area of said plurality of distance measuring windows corresponding to image data of said second vehicle on the image picked up by said first image sensor;

symmetry detecting means for shifting said comparison window within an area defined by said plurality of distance measuring windows in a direction of said plurality of distance measuring windows to detect symmetry of said image in said comparison window with every shift; and estimating means for estimating presence and position of said second vehicle in said image picked up by said first image sensor based on data obtained by said symmetry detecting means and said first distance detecting means.

2. A device according to claim 1, wherein said estimating means determines the position of said second vehicle in said image picked up by said first image sensor on the basis of a stability of the symmetry and the detected distance.

3. A device according to claim 1, further comprising: tracing window setting means for automatically setting a tracing window for tracing said second vehicle and having a size corresponding to the distance to said second vehicle; tracing means for tracing said second vehicle in said image picked up by said first image sensor by said tracing window; and second distance detecting means for detecting a distance to said second vehicle included in said tracing window from said first vehicle.

4. A device according to claim 3, wherein the size of said tracing window corresponding to the distance to said second vehicle is the same as a size of a single region corresponding to the plurality of adjoining windows used for symmetry detection.

5. A device according to claim 1, further comprising display means for displaying said image picked up by said first image sensor and said distance measuring windows.

* * * * *